(12) United States Patent
Matsumoto

(10) Patent No.: US 11,928,370 B2
(45) Date of Patent: Mar. 12, 2024

(54) IMAGE FORMING APPARATUS, COMMUNICATION DEVICE, AND IMAGE FORMING SYSTEM

(71) Applicant: KYOCERA Document Solutions Inc., Osaka (JP)

(72) Inventor: Hitoshi Matsumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/320,881

(22) Filed: May 19, 2023

(65) Prior Publication Data

US 2023/0384993 A1 Nov. 30, 2023

(30) Foreign Application Priority Data

May 24, 2022 (JP) .................. 2022-084270

(51) Int. Cl.
*G06F 3/12* (2006.01)
*G06F 13/38* (2006.01)
*G06F 13/42* (2006.01)

(52) U.S. Cl.
CPC .......... *G06F 3/1221* (2013.01); *G06F 3/1229* (2013.01); *G06F 3/1236* (2013.01); *G06F 3/128* (2013.01); *G06F 13/382* (2013.01); *G06F 13/4282* (2013.01); *G06F 2213/0042* (2013.01)

(58) Field of Classification Search
CPC .... G06F 3/1221; G06F 3/1229; G06F 3/1236; G06F 3/128; G06F 13/382; G06F 13/4282; G06F 2213/0042
See application file for complete search history.

(56) References Cited

U.S. PATENT DOCUMENTS

| 2019/0179393 A1* | 6/2019 | Sato .................... G06F 1/28 |
| 2019/0227609 A1* | 7/2019 | Koshigaya ............ G06F 1/266 |
| 2021/0067653 A1 | 3/2021 | Obata |

FOREIGN PATENT DOCUMENTS

JP 2021037705 A 3/2021

\* cited by examiner

*Primary Examiner* — Quang N Vo
(74) *Attorney, Agent, or Firm* — Alleman Hall & Tuttle LLP

(57) ABSTRACT

A USB host portion is supplied with power in a normal mode, and the power supply is stopped in a power saving mode. The USB host portion can acquire print request data from a communication device while outputting a first control signal. Power is supplied to a signal input portion and a signal output portion in both modes. The signal input portion can receive a signal from the communication device. A control portion shifts to the normal mode when a notification signal is input to the signal input portion while operating in the power saving mode. The signal output portion outputs a second control signal in both the normal mode and the power saving mode. The voltage output portion outputs a rated voltage to the communication device when at least one of the first control signal and the second control signal is output.

3 Claims, 2 Drawing Sheets

IMAGE FORMING APPARATUS, COMMUNICATION DEVICE, AND IMAGE FORMING SYSTEM

INCORPORATION BY REFERENCE

This application is based upon and claims the benefit of priority from the corresponding Japanese Patent Application No. 2022-084270 filed on May 24, 2022, the entire contents of which are incorporated herein by reference.

BACKGROUND

The present disclosure relates to an image forming apparatus, a communication device, and an image forming system including a USB interface.

It is known that, in an image forming apparatus, a control portion operates in a normal mode or a power saving mode.

The control portion shifts from the normal mode to the power saving mode when a sleep condition is satisfied. For example, the sleep condition is a condition that a state where no print request is received continues for a predetermined period of time.

The control portion returns from the power saving mode to the normal mode when the control portion receives a print request from an information processing apparatus while operating in the power saving mode.

SUMMARY

An image forming apparatus according to one aspect of the present disclosure includes a USB interface, a control portion, and a voltage output portion. The USB interface includes a VBUS terminal, a D+ terminal, a D− terminal, and an ID terminal. The control portion controls a communication device connected to the USB interface. The voltage output portion is capable of outputting a rated voltage to the communication device through the VBUS terminal. The control portion is operable in a normal mode or a power saving mode in which power consumption is smaller than in the normal mode. The control portion includes a USB host portion, a signal input portion, and a signal output portion. The USB host portion is supplied with power in the normal mode, and the power supply is stopped in the power saving mode. Power is supplied to the signal input portion and the signal output portion in both the normal mode and the power saving mode. In the normal mode, the USB host portion is capable of acquiring, through the D+ terminal and the D− terminal, print request data received by the communication device while outputting a first control signal. The signal input portion is capable of receiving a signal from the communication device through the ID terminal. The control portion shifts to the normal mode when a notification signal is input to the signal input portion while operating in the power saving mode. The signal output unit outputs a second control signal after the first control signal is output when the control portion is activated, and outputs the second control signal in both the normal mode and the power saving mode. The voltage output portion outputs the rated voltage when at least one of the first control signal and the second control signal is output.

A communication device according to another aspect of the present disclosure includes a USB interface, a communication portion, a notification portion, a delay signal generation portion, and a pull-up portion. The USB interface includes a VBUS terminal, a D+ terminal, a D− terminal, and an ID terminal, and is connected to an image forming apparatus. The communication portion outputs a start signal when a rated voltage is supplied from the image forming apparatus through the VBUS terminal, and relays transmission of communication data exchanged between an information processing apparatus and the image forming apparatus through the D+ terminal and the D− terminal while communicating with the information processing apparatus. The notification portion outputs a notification signal to the ID terminal when the communication portion receives data from the information processing apparatus. The delay signal generation portion outputs a delay signal obtained by delaying the notification signal. The pull-up portion pulls up a potential of the D+ terminal to a reference potential when at least one of the start signal and the delay signal is output.

An image forming system according to another aspect of the present disclosure includes the image forming apparatus and the communication device connected to the image forming apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
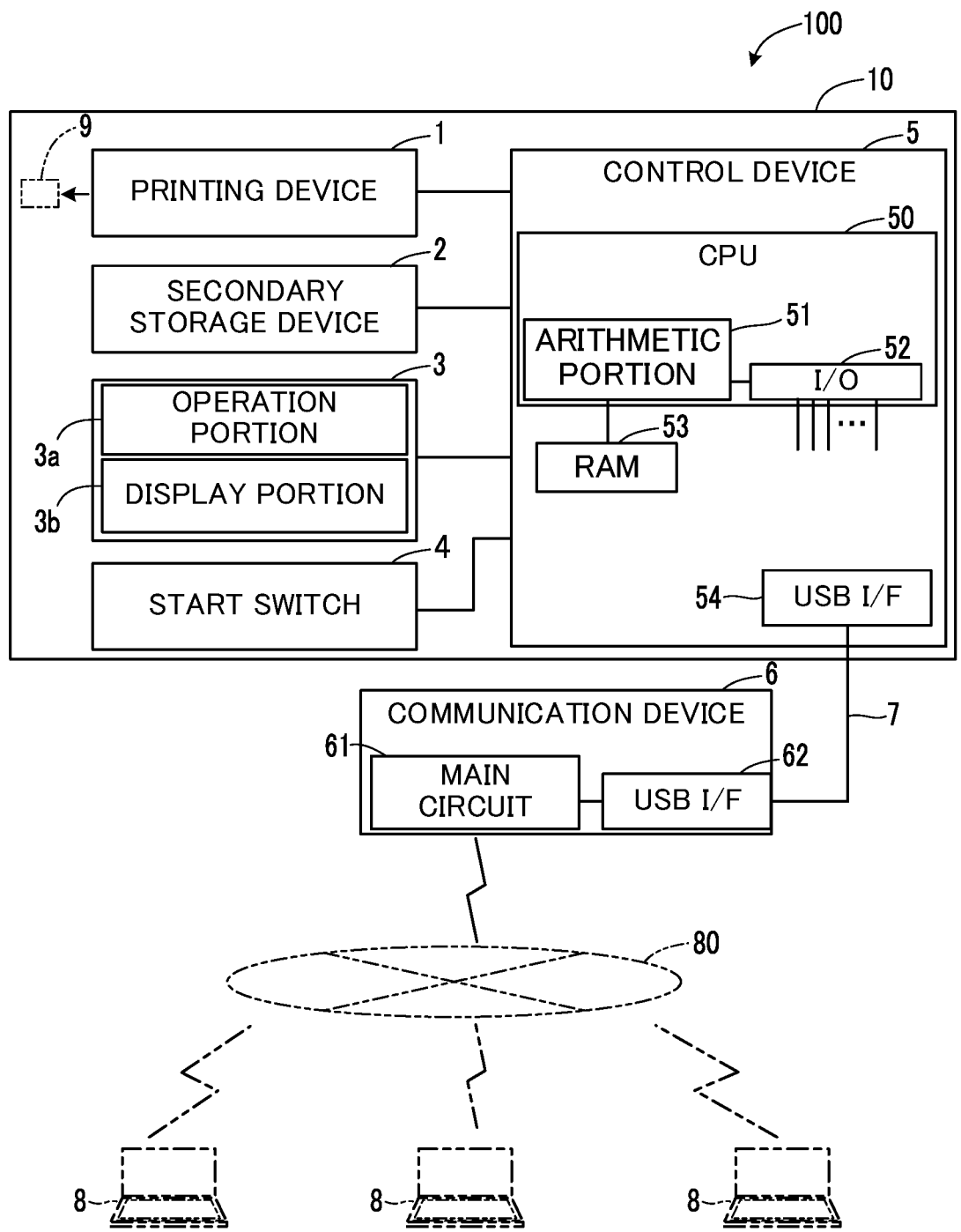
FIG. 1 is a block diagram showing a configuration of an image forming system according to an embodiment.

Hereinafter, an embodiment of the present disclosure will be described with reference to the drawings. It is noted that the following embodiment is an example of embodying the present disclosure and does not limit the technical scope of the present disclosure.

[Configuration of Image Forming System 100]

An image forming system 100 according to the embodiment includes an image forming apparatus 10 and a communication device 6. The image forming apparatus 10 and the communication device 6 are connected by a cable 7. The image forming apparatus 10 can communicate with one or more information processing apparatuses 8 through the communication device 6.

The image forming apparatus 10 includes a printing device 1, a secondary storage device 2, an operation unit 3, a start switch 4, and a control device 5.

The printing device 1 performs a printing process. The printing process is a process of forming an image on a sheet 9. For example, the printing device 1 executes the printing process using an electrophotographic method or an inkjet method.

The secondary storage device 2 is a computer-readable nonvolatile storage device. For example, one or both of a flash memory and a hard disk drive are employed as the secondary storage device 2.

The operation unit 3 is a human interface device such as a touch panel unit. The operation unit 3 includes an operation portion 3a and a display portion 3b. The operation portion 3a is a device that receives a human operation. The display portion 3b is a panel display device capable of displaying information.

The start switch 4 is an operation switch that receives an operation for shifting the image forming apparatus 10 from a sleep mode to an operation mode.

The control device 5 includes a central processing unit (CPU) 50 and a random access memory (RAM) 53. The CPU 50 executes various types of control and data processing by executing computer programs stored in the secondary storage device 2.

The RAM 53 is a computer-readable volatile storage device. The RAM 53 temporarily stores the computer program executed by the CPU 50. Further, the RAM 53 temporarily stores data to be output and referred to while the CPU 50 is executing various processes.

For example, the CPU 50 controls the display portion 3b of the operation unit 3 to cause the display portion 3b to display various operation screens.

Further, the CPU 50 controls the printing device 1 to cause the printing device 1 to execute the printing process. For example, when receiving a print request through the communication device 6, the CPU 50 causes the printing device 1 to execute the printing process.

The CPU 50 controls the communication device 6 to communicate with the information processing apparatus 8 through the communication device 6. The communication device 6 communicates with the information processing apparatus 8 via a network 80. The network 80 is a wired local area network (LAN) or a wireless LAN.

The CPU 50 includes an arithmetic portion 51 and an I/O 52. The arithmetic portion 51 executes various types of data processing. The I/O 52 converts signals output by various sensors or the communication device 6 into digital data, and transmits the digital data to the arithmetic portion 51. Further, the I/O 52 converts a control command transmitted from the arithmetic portion 51 into a control signal, and outputs the control signal to an apparatus to be controlled.

The CPU 50 is an example of the control portion that controls the printing device 1, the operation unit 3, and the communication device 6. The CPU 50 operates in a normal mode or a power saving mode.

When the CPU 50 is in the normal mode, the arithmetic portion 51 is supplied with power. When the CPU 50 is in the power saving mode, the power supply to the arithmetic portion 51 is stopped.

The CPU 50 operates in the power saving mode with a smaller power consumption than in the normal mode.

When operating in the normal mode, the CPU 50 is capable of receiving the print request through the communication device 6 and causing the printing device 1 to execute the printing process.

The CPU 50 shifts from the normal mode to the power saving mode when a sleep condition is satisfied. For example, the sleep condition is a condition that a state where no print request is received continues for a predetermined period of time.

The CPU 50 returns from the power saving mode to the normal mode when the CPU 50 receives the print request from the information processing apparatus 8 while operating in the power saving mode.

Further, the CPU 50 returns from the power saving mode to the normal mode when the CPU 50 detects that the start switch 4 has been operated while operating in the power saving mode.

The control device 5 of the image forming apparatus 10 further includes a host interface 54. The host interface 54 is a USB interface of the image forming apparatus 10. The CPU 50 is connected to the communication device 6 through the host interface 54. The CPU 50 controls the communication device 6 connected to the host interface 54.

In the present embodiment, the CPU 50 needs to be able to return from the power saving mode to the normal mode in response to receipt of the print request by the communication device 6.

Meanwhile, it is desired to reduce the power consumption of the image forming apparatus 10 in the power saving mode as much as possible. The configurations of the image forming apparatus 10 and the communication device 6 for reducing the power consumption in the power saving mode will be described below.

The I/O 52 of the CPU 50 includes a plurality of normal ports 52a and a plurality of special ports 52b. The plurality of normal ports 52a and the plurality of special ports 52b are signal ports into which signals can be input and from which signals can be output.

The plurality of normal ports 52a are supplied with power when the CPU 50 is in the normal mode, and the power supply is stopped when the CPU 50 is in the power saving mode.

The plurality of special ports 52b are supplied with power when the CPU 50 is in either the normal mode or the power saving mode.

In the present embodiment, the plurality of normal ports 52a include a first normal port 521, a second normal port 522, and a third normal port 523. In addition, the plurality of special ports 52b include a first special port 524 and a second special port 525.

Figure 2:
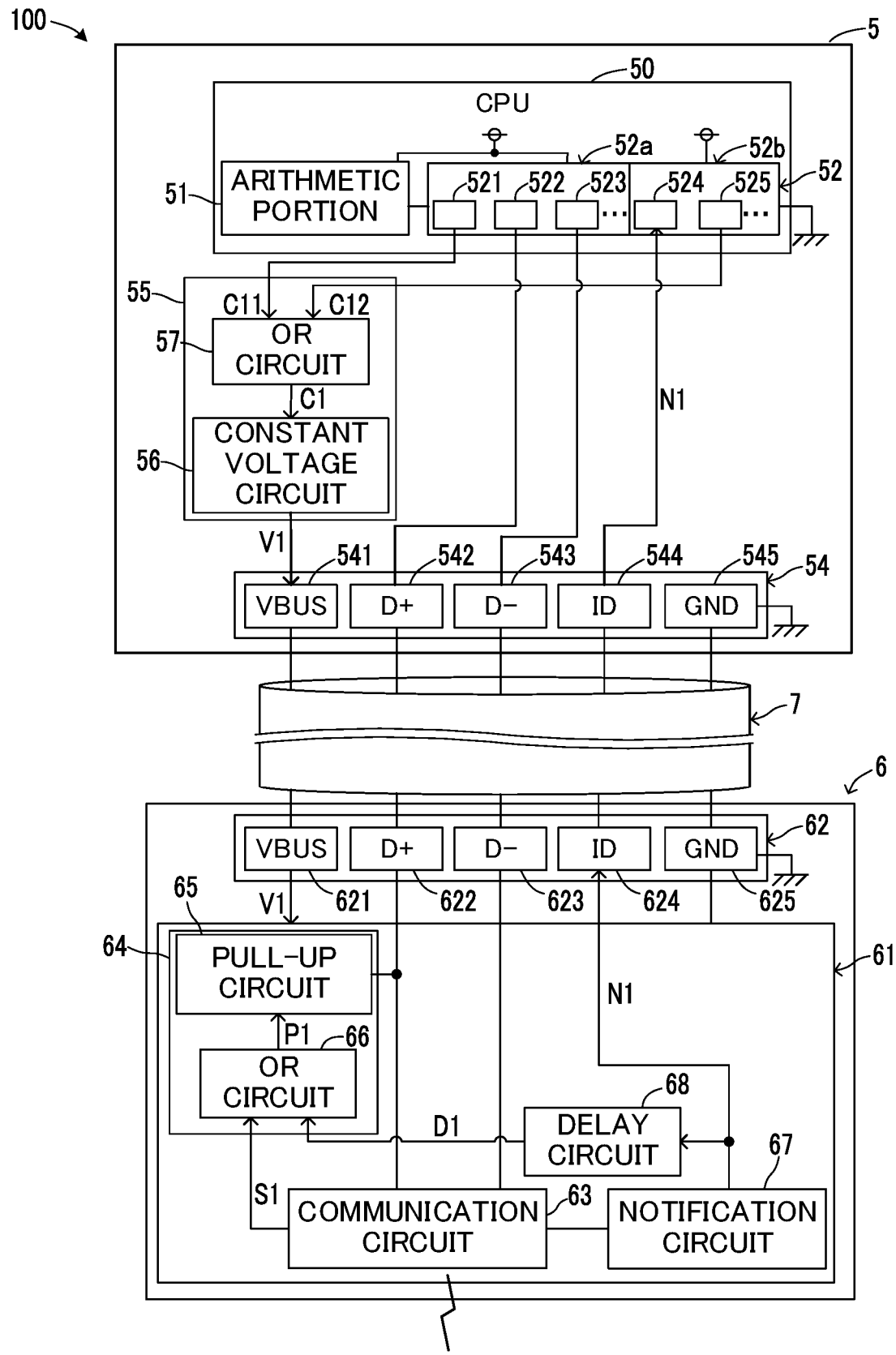
FIG. 2 is a block diagram showing a configuration of a portion related to a USB interface in the image forming system according to the embodiment.

The control device 5 further includes a voltage output portion 55 (see FIG. 2). On the other hand, the communication device 6 includes a main circuit 61 and a device interface 62 (see FIG. 1). The device interface 62 is a USB interface of the communication device 6.

The host interface 54 includes a VBUS terminal 541, a D+ terminal 542, a D− terminal 543, an ID terminal 544, and a ground terminal 545. The ground terminal 545 is electrically connected to a ground conductor in the image forming apparatus 10.

The device interface 62 also includes a VBUS terminal 621, a D+ terminal 622, a D− terminal 623, an ID terminal 624, and a ground terminal 625.

The host interface 54 and the device interface 62 are connected by the cable 7. The cable 7 includes five signal lines connecting the five terminals of the host interface 54 to the five terminals of the device interface 62.

That is, the cable 7 connects the VBUS terminal 541, the D+ terminal 542, the D− terminal 543, the ID terminal 544, and the ground terminal 545 of the host interface 54 to the VBUS terminal 621, the D+ terminal 622, the D− terminal 623, the ID terminal 624, and the ground terminal 625 of the device interface 62, respectively.

The voltage output portion 55 can output a rated voltage V1 to the communication device 6 through the VBUS terminal 541 of the host interface 54. In the USB standard, the rated voltage V1 is 5 volts.

In the communication device 6, the rated voltage V1 is supplied to the main circuit 61 through the VBUS terminal 621 of the device interface 62.

In the normal mode, the arithmetic portion 51 can execute data communication using the communication device 6 while outputting a first control signal C11 through the first normal port 521.

The arithmetic portion 51 executes the data communication through the second normal port 522 and the third normal port 523. The arithmetic portion 51, the second normal port 522, and the third normal port 523 are an example of the USB host portion.

The second normal port 522 and the third normal port 523 are connected to the D+ terminal 542 and the D− terminal 543 of the host interface 54, respectively. That is, the arithmetic portion 51 can execute the data communication through the D+ terminal 542 and the D− terminal 543 of the host interface 54.

The data communication includes acquiring print request data received from the information processing apparatus 8 by the communication device 6. That is, the arithmetic portion 51 can acquire the print request data through the D+ terminal 542 and the D− terminal 543 of the host interface 54.

The first special port 524 of the CPU 50 can receive a signal from the communication device 6 through the ID terminal 544 of the host interface 54. The first special port 524 is an example of the signal input portion.

The CPU 50 shifts to the normal mode when a notification signal N1 is input to the first special port 524 while the CPU 50 is operating in the power saving mode.

The notification signal N1 is input to the first special port 524 through the ID terminal 544 of the host interface 54. The first special port 524 can receive the notification signal N1 even when the CPU 50 is operating in the power saving mode.

The CPU 50 is activated by being supplied with power. When the CPU 50 is activated, the arithmetic portion 51 outputs a second control signal C12 through the second special port 525. That is, when the CPU 50 is activated, the second special port 525 outputs the second control signal C12. The second control signal C12 is output from the second special port 525 after the first control signal C11 is output from the first normal port 521.

After outputting the second control signal C12, the second special port 525 continues to output the second control signal C12 regardless of the change in the operation mode of the CPU 50. That is, the second special port 525 outputs the second control signal C12 in both the normal mode and the power saving mode. The second special port 525 is an example of the signal output portion.

The voltage output portion 55 includes an OR circuit 57 and a constant voltage circuit 56. The first control signal C11 and the second control signal C12 are input to the OR circuit 57.

The OR circuit 57 outputs an OR signal of the first control signal C11 and the second control signal C12 as a main control signal C1. That is, the OR circuit 57 outputs an active main control signal C1 when at least one of the first control signal C11 and the second control signal C12 is output.

The output end of the OR circuit 57 is connected to the constant voltage circuit 56. When the active main control signal C1 is input, the constant voltage circuit 56 outputs the rated voltage V1 to the VBUS terminal 541 of the host interface 54.

The constant voltage circuit 56 does not output the rated voltage V1 when the active main control signal C1 is not input.

Therefore, the voltage output portion 55 outputs the rated voltage V1 when at least one of the first control signal C11 and the second control signal C12 is output. As described above, the voltage output portion 55 outputs the rated voltage V1 to the communication device 6 through the VBUS terminal 541 of the host interface 54.

On the other hand, the main circuit 61 of the communication device 6 includes a communication circuit 63, a pull-up portion 64, a notification circuit 67, and a delay circuit 68. The communication circuit 63 is supplied with the rated voltage V1 from the image forming apparatus 10 through the VBUS terminal 621 of the device interface 62.

The communication circuit 63 outputs a start signal S1 to the pull-up portion 64 when the rated voltage V1 is supplied from the image forming apparatus 10. Further, the communication circuit 63 communicates with the information processing apparatus 8 through the network 80.

The communication circuit 63 relays transmission of communication data through the D+ terminal 622 and the D− terminal 623 of the device interface 62 while communicating with the information processing apparatus 8. The communication data is data exchanged between the information processing apparatus 8 and the image forming apparatus 10.

When the communication circuit 63 receives data from the information processing apparatus 8, the notification circuit 67 outputs a notification signal N1 to the ID terminal 624 of the device interface 62. The notification signal N1 is transmitted to the first special port 524 through the cable 7 and the ID terminal 544 of the host interface 54.

The delay circuit 68 outputs a delay signal D1 obtained by delaying the notification signal N1 to the pull-up portion 64. The communication circuit 63 is an example of the communication portion. The notification circuit 67 is an example of the notification portion. The delay circuit 68 is an example of the delay signal generation portion.

The pull-up portion 64 includes a pull-up circuit 65 and an OR circuit 66. The start signal S1 and the delay signal D1 are input to the OR circuit 66. The OR circuit 66 outputs an OR signal of the start signal S1 and the delay signal D1 to the pull-up circuit as a pull-up signal P1.

That is, the OR circuit 66 outputs an active pull-up signal P1 when at least one of the first control signal C11 and the second control signal C12 is output.

When the active pull-up signal P1 is input, the pull-up circuit 65 pulls up the potential of the D+ terminal 622 of the device interface 62 to the reference potential. When a predetermined time has elapsed from the input of the active pull-up signal P1, the pull-up circuit 65 cancels the pull-up of the potential of the D+ terminal 622.

That is, when at least one of the start signal S1 and the delay signal D1 is output, the pull-up portion 64 pulls up the potential of the D+ terminal 622 of the device interface 62 to the reference potential.

Hereinafter, an operation of the image forming system will be described.

When the image forming apparatus 10 is activated, the control device 5 is supplied with power, and the CPU 50 is activated. Upon activation, the CPU 50 operates in the normal mode.

When the CPU 50 starts operating in the normal mode, the arithmetic portion 51 outputs the first control signal C11 to the voltage output portion 55 through the first normal port 521. Thus, the voltage output portion 55 outputs the rated voltage V1 to the VBUS terminal 541 of the host interface 54.

The rated voltage V1 output by the voltage output portion 55 is supplied to the main circuit 61 of the communication device 6 through the VBUS terminal 621 of the device interface 62. Thus, power is supplied to the communication circuit 63, the pull-up portion 64, the notification circuit 67, and the delay circuit 68.

The communication circuit 63 is activated in response to the supply of the rated voltage V1. When activated, the communication circuit 63 outputs the start signal S1 to the pull-up portion 64. Thus, the pull-up portion 64 pulls up the potential of the D+ terminal 622 of the device interface 62 to the reference potential.

When the potential of the D+ terminal 622 of the device interface 62 is pulled up to the reference potential, the potential of the D+ terminal 542 of the host interface 54 is also pulled up to the reference potential.

Meanwhile, the arithmetic portion 51 of the image forming apparatus 10 monitors the state of the signal of the second normal port 522. Thus, the arithmetic portion 51 detects that the potential of the D+ terminal 542 of the host interface 54 has been pulled up to the reference potential.

By detecting that the potential of the D+ terminal 542 of the host interface 54 has been pulled up to the reference potential, the arithmetic portion 51 detects that communication through the communication device 6 is possible.

After outputting the first control signal C11 through the first normal port 521, the arithmetic portion 51 outputs the second control signal C12 through the second special port 525. For example, the arithmetic portion 51 outputs the second control signal C12 when it detects that the potential of the D+ terminal 542 of the host interface 54 has been pulled up to the reference potential.

The communication circuit 63 of the communication device 6 outputs a reception notification to the notification circuit 67 when receiving data from the information processing apparatus 8. The notification circuit 67 outputs the notification signal N1 to the ID terminal 624 of the device interface 62 in response to the reception notification.

The notification signal N1 is transmitted to the first special port 524 of the CPU through the ID terminal 624 of the device interface 62 and the ID terminal 544 of the host interface 54.

The CPU 50 ignores the input of the notification signal N1 in the normal mode.

The communication circuit 63 transmits the data received from the information processing apparatus 8 to the image forming apparatus 10 through the D+ terminal 542 and the D− terminal 543 of the device interface 62. Further, when the data transmitted from the image forming apparatus 10 is input through the D+ terminal 542 and the D− terminal 543 of the device interface 62, the communication circuit 63 transmits the data to the information processing apparatus 8.

When the sleep condition is satisfied, the CPU 50 of the image forming apparatus 10 shifts from the normal mode to the power saving mode. Thus, the power supply to the arithmetic portion 51 and the plurality of normal ports 52a is stopped.

However, the second special port 525 keeps outputting the second control signal C12. That is, even after the CPU 50 shifts from the normal mode to the power saving mode, the supply of the rated voltage V1 from the voltage output portion 55 to the communication device 6 is maintained.

Therefore, when the CPU 50 is operating in the power saving mode, the communication device 6 can receive data from the information processing apparatus 8.

When the communication circuit 63 receives data from the information processing apparatus 8 while the CPU 50 is operating in the power saving mode, the notification circuit 67 outputs the notification signal N1. Thus, the notification signal N1 is transmitted to the first special port 524 through the ID terminal 624 of the device interface 62 and the ID terminal 544 of the host interface 54.

When the notification signal N1 is input to the first special port 524 while the CPU 50 is operating in the power saving mode, the CPU 50 returns from the power saving mode to the normal mode.

After the CPU 50 returns from the power saving mode to the normal mode, the arithmetic portion 51 outputs the first control signal C11 through the first normal port 521. In this case, since the output of the second control signal C12 is maintained, the state of the output of the rated voltage V1 does not change.

When the CPU 50 returns from the power saving mode to the normal mode, the arithmetic portion 51 outputs the first control signal C11 through the first normal port 521.

The delay circuit 68 of the communication device 6 outputs the delay signal D1 at a timing corresponding to the output of the first control signal C11. Thus, the pull-up portion 64 pulls up the potential of the D+ terminal 622 of the device interface 62 to the reference potential.

The delay time of the delay circuit 68 is set in accordance with the time required for the CPU 50 to return from the power saving mode to the normal mode and for the first normal port 521 to output the first control signal C11.

After the CPU 50 returns from the power saving mode to the normal mode, the arithmetic portion 51 detects that the potential of the D+ terminal 542 of the host interface 54 has been pulled up to the reference potential.

After detecting that the potential of the D+ terminal 542 has been pulled up to the reference potential, the arithmetic portion 51 executes the data communication using the communication device 6 while outputting the first control signal C11.

By employing the image forming system 100, the CPU 50 can completely stop the power supply to the arithmetic portion 51 in the power saving mode. This reduces the power consumption of the image forming apparatus 10 in the power saving mode.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a USB interface including a VBUS terminal, a D+ terminal, a D− terminal, and an ID terminal;
a control portion configured to control a communication device connected to the USB interface; and
a voltage output portion capable of outputting a rated voltage to the communication device through the VBUS terminal, wherein
the control portion is operable in a normal mode or a power saving mode in which power consumption is smaller than in the normal mode,
the control portion includes:
  a USB host portion to which power is supplied in the normal mode and to which power supply is stopped in the power saving mode; and
  a signal input portion and a signal output portion to which power is supplied in both the normal mode and the power saving mode,
in the normal mode, the USB host portion is capable of acquiring, through the D+ terminal and the D− terminal, print request data received by the communication device while outputting a first control signal, the signal input portion is capable of receiving a signal from the communication device through the ID terminal, the control portion shifts to the normal mode when a notification signal is input to the signal input portion while operating in the power saving mode, the signal output portion outputs a second control signal after the first control signal is output when the control portion is activated, and outputs the second control signal in both the normal mode and the power saving mode, and the voltage output portion outputs the rated voltage when at least one of the first control signal and the second control signal is output.

2. A communication device comprising:

a USB interface including a VBUS terminal, a D+ terminal, a D− terminal, and an ID terminal and connected to an image forming apparatus;

a communication portion configured to output a start signal when a rated voltage is supplied from the image forming apparatus through the VBUS terminal, and relay transmission of communication data exchanged between an information processing apparatus and the image forming apparatus through the D+ terminal and the D− terminal while communicating with the information processing apparatus;

a notification portion configured to output a notification signal to the ID terminal when the communication portion receives data from the information processing apparatus;

a delay signal generation portion configured to output a delay signal obtained by delaying the notification signal; and a pull-up portion configured to pull up a potential of the D+ terminal to a reference potential when at least one of the start signal and the delay signal is output.

3. An image forming system comprising:

the image forming apparatus according to claim 1; and a communication device connected to the image forming apparatus, the communication device including:

a USB interface including a VBUS terminal, a D+ terminal, a D− terminal, and an ID terminal and connected to an image forming apparatus;

a communication portion configured to output a start signal when a rated voltage is supplied from the image forming apparatus through the VBUS terminal, and relay transmission of communication data exchanged between an information processing apparatus and the image forming apparatus through the D+ terminal and the D− terminal while communicating with the information processing apparatus;

a notification portion configured to output a notification signal to the ID terminal when the communication portion receives data from the information processing apparatus;

a delay signal generation portion configured to output a delay signal obtained by delaying the notification signal; and a pull-up portion configured to pull up a potential of the D+ terminal to a reference potential when at least one of the start signal and the delay signal is output.

* * * * *